(12) United States Patent
Gautama

(10) Patent No.: US 11,671,047 B2
(45) Date of Patent: Jun. 6, 2023

(54) VOICE COIL ACTUATOR DRIVER SIGNAL GENERATOR

(71) Applicant: GOODIX TECHNOLOGY (HK) COMPANY LIMITED, Hong Kong (HK)

(72) Inventor: Temujin Gautama, Redhill (GB)

(73) Assignee: GOODIX TECHNOLOGY (HK) COMPANY LIMITED, Hong Kong (HK)

( * ) Notice: Subject to any disclaimer, the term of this patent is extended or adjusted under 35 U.S.C. 154(b) by 281 days.

(21) Appl. No.: 17/139,930

(22) Filed: Dec. 31, 2020

(65) Prior Publication Data
US 2021/0126568 A1    Apr. 29, 2021

Related U.S. Application Data

(63) Continuation of application No. PCT/CN2020/085825, filed on Apr. 21, 2020.

(30) Foreign Application Priority Data

Aug. 14, 2019    (EP) .................................... 19191817

(51) Int. Cl.
| | |
|---|---|
| *H02P 25/034* | (2016.01) |
| *H02P 6/182* | (2016.01) |
| *G06F 3/01* | (2006.01) |
| *G08B 6/00* | (2006.01) |

(52) U.S. Cl.
CPC ............ *H02P 25/034* (2016.02); *H02P 6/182* (2013.01); *G06F 3/016* (2013.01); *G08B 6/00* (2013.01)

(58) Field of Classification Search
CPC ........ H02P 25/034; H02P 6/182; G06F 3/016; G08B 6/00
See application file for complete search history.

(56) References Cited

U.S. PATENT DOCUMENTS

| | | | |
|---|---|---|---|
| 6,075,671 A * | 6/2000 | Yoneda | ................ G11B 5/6005 |
| 8,249,440 B2 | 8/2012 | Fan et al. | |
| 9,002,188 B2 | 4/2015 | Fan et al. | |
| 10,212,360 B2 | 2/2019 | Ryu et al. | |
| 10,241,348 B2 | 3/2019 | Bang et al. | |
| 10,298,163 B2 | 5/2019 | Vasilev et al. | |
| 2002/0149873 A1 * | 10/2002 | Schillaci | ............... G11B 21/083 |
| | | | 360/78.04 |
| 2010/0080545 A1 | 4/2010 | Fan et al. | |
| 2013/0083231 A1 | 4/2013 | Fan et al. | |
| 2016/0050497 A1 * | 2/2016 | Daubigny | ................ H04R 3/02 |
| | | | 381/120 |
| 2017/0160557 A1 | 6/2017 | Bang et al. | |

(Continued)

FOREIGN PATENT DOCUMENTS

| | | |
|---|---|---|
| CN | 102290924 A | 12/2011 |
| CN | 106842771 A | 6/2017 |

(Continued)

*Primary Examiner* — Zoheb S Imtiaz
(74) *Attorney, Agent, or Firm* — Scully, Scott, Murphy & Presser, P.C.

(57) ABSTRACT

An apparatus and a method for generating a voice coil actuator (VCA) signal is described. A drive signal is generated to drive the VCA and a resulting current signal from the VCA detected. The frequency of the drive signal is adapted in response to detecting an asymmetry in the current signal.

20 Claims, 9 Drawing Sheets

(56) References Cited

U.S. PATENT DOCUMENTS

| | | |
|---|---|---|
| 2017/0163196 A1 | 6/2017 | Kim et al. |
| 2018/0158289 A1 | 6/2018 | Vasilev et al. |
| 2018/0278853 A1 | 9/2018 | Ryu et al. |
| 2019/0207547 A1 | 7/2019 | Deng et al. |

FOREIGN PATENT DOCUMENTS

| | | |
|---|---|---|
| CN | 107210696 A | 9/2017 |
| CN | 107342719 A | 11/2017 |
| CN | 108155846 A | 6/2018 |
| CN | 108258973 A | 7/2018 |
| CN | 108668056 A | 10/2018 |
| EP | 1241670 A1 | 9/2002 |

\* cited by examiner

VOICE COIL ACTUATOR DRIVER SIGNAL GENERATOR

CROSS-REFERENCE TO RELATED APPLICATIONS

This application is a continuation of International Application No. PCT/CN2020/085825, filed on Apr. 21, 2020, which claims priority to EP Patent Application No. 19191817.6 entitled "VOICE COIL ACTUATOR DRIVER SIGNAL GENERATOR" filed on Aug. 14, 2019. The disclosures of the aforementioned applications are hereby incorporated by reference in their entireties.

FIELD

This disclosure relates to an apparatus and method for generating a voice coil actuator driver signal.

BACKGROUND

Voice coil actuators (VCA) are motor devices that use a permanent magnet field and a coil, which is often referred to as the voice coil. Current flowing through the voice coil, interacts with the magnetic field and generates a force that is perpendicular to the direction of the current. Examples of voice coil actuators include loudspeakers, linear resonant actuators (LRA) and voice coil motors (VCM).

The linear resonant actuator (LRA) is an actuator that is used for example to generate haptic feedback in devices such as mobile phones for alerting the user or enhancing the human machine interface on mobile phones or other devices with touch pads for example by implementing virtual buttons. The LRA is typically driven with a periodic signal, the frequency of which matches the LRA resonance frequency at which the LRA can be driven most efficiently.

The voice coil motor (VCM) is an actuator that generates a movement along a single axis. It is often used to implement the lens position control in small cameras, such as those used in smartphones, to focus the camera, due to their small size, low cost and ease of implementation. One of the performance objectives of a VCM system is to quickly reach a certain stable displacement level, i.e., without ringing.

SUMMARY

Various aspects of the disclosure are defined in the accompanying claims. In a first aspect there is provided a method for generating a voice coil actuator (VCA) drive signal comprising: generating a drive signal to drive a VCA; receiving a current signal from the VCA corresponding to the generated drive signal; generating an adapted drive signal dependent on an asymmetry of the current signal.

In one or more embodiments, generating the drive signal and generating the adapted drive signal may comprise generating at least one transition between a first amplitude level and a second amplitude level.

In one or more embodiments, generating the adapted drive signal may further comprise a filtering operation.

In one or more embodiments, generating the adapted drive signal may further comprise adapting the time between consecutive transitions.

In one or more embodiments, determining an asymmetry in the current signal may comprise determining the asymmetry over an evaluation segment having a duration less than or equal to a half period of the drive signal and detecting whether the current signal is temporally asymmetrical.

In one or more embodiments, determining an asymmetry in the current signal may further comprise determining the difference between a sample value in the first half of the evaluation segment and a corresponding sample value in the second half of the evaluation segment.

In one or more embodiments, determining an asymmetry in the current signal may further comprise determining the average difference between sample values in the first half of the evaluation segment and corresponding sample values in the second half of the evaluation segment.

In one or more embodiments, determining an asymmetry in the current signal may further comprise determining the slope of the linear regression curve of the samples in the evaluation segment.

In one or more embodiments, the generated drive signal may further comprise a plurality of segments, each segment including a transition between a first amplitude level and a second amplitude level wherein the time between consecutive transitions is varied. Measuring the current signal may further comprise measuring a plurality of current signal segments, each current signal segment corresponding to a respective drive signal segment. The method may further comprise estimating a resonance frequency of the VCA from the duration of the current signal segment with the least asymmetry; and generating the adapted drive signal dependent on the estimated resonance frequency of the VCA.

In one or more embodiments, generating the adapted drive signal may comprises adapting the filter characteristics to have a stop-band including the estimated resonance frequency.

In a second aspect there is provided a computer program product comprising instructions which, when being executed by a processing unit, cause said processing unit to perform the steps of generating a VCA drive signal by generating a drive signal to drive a VCA; receiving a current signal from the VCA corresponding to the generated drive signal; generating an adapted drive signal dependent on an asymmetry of the current signal.

In a third aspect there is provided a VCA driver signal generator comprising: a signal generator configured to generate a drive signal to drive a VCA; a controller coupled to the signal generator and configured to be coupled to a current sensor for sensing a current signal from the VCA, the current signal corresponding to the generated drive signal; wherein the controller is configured to measure the current signal and to control the signal generator to generate an adapted drive signal dependent on an asymmetry in the current signal.

In one or more embodiments, the controller may be further configured to detect an asymmetry in the current signal by determining the asymmetry over an evaluation segment having a duration less than or equal to a half period of the drive signal and detecting whether the current signal is temporally asymmetrical.

In one or more embodiments, the controller may be further configured to determine an asymmetry in the current signal by determining the slope of the linear regression curve of the samples in the evaluation segment.

In one or more embodiments, the controller may be further configured to detect an asymmetry in the current signal by determining the average difference between sample values in the first half of the evaluation segment and sample values in the second half of the evaluation segment.

BRIEF DESCRIPTION OF THE DRAWINGS

In the figures and description like reference numerals refer to like features. Embodiments of are now described in detail, by way of example only, illustrated by the accompanying drawings in which.

DETAILED DESCRIPTION

Figure 1:
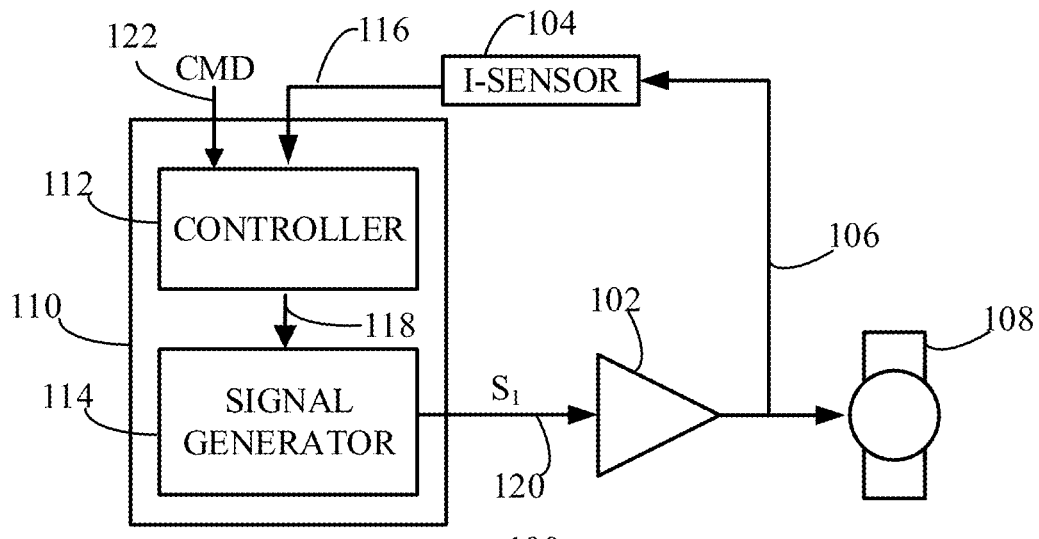
FIG. 1 shows a VCA driver system including a voice coil actuator driver signal generator according to an example embodiment.

FIG. 1 shows a VCA driver system 100 including a VCA driver signal generator 110, a current sensor 104, a VCA driver 102 and a VCA 108 which may be either a LRA or a VCM. The VCA driver signal generator 110 includes a controller 112 and a signal generator 114. The controller 112 may have a command input 122. A controller output 118 may be connected to a control input of the signal generator 114. A signal generator output 120 may be connected to an input of the VCA driver 102 which may be a class-D amplifier. The VCA driver output 106 may be connected to VCA 108. The VCA driver output 106 may be connected to an input of the current sensor 104. The current sensor output 116 may be connected to a current sensor input of the controller 112.

In operation, the signal generator 114 may output a signal 120 denoted s1, which is fed into the VCA driver 102 that is configured to drive the VCA 108. This signal s1 is typically a square wave or a step function or other signal that has for example alternating transitions or a single transition from a first voltage (or current) level to a second voltage (or current) level. The current flowing into the VCA 108 may be sensed by the current sensor 104 and a current signal value may be provided by the current sensor 104 to the controller 112. The controller 112 may receive a command on the command input 122 to configure the operation mode. For example in a normal operation mode, the excitation signal may be a square wave if the VCA 108 is a LRA used to provide haptic feedback. In other examples if the VCA 108 is a VCM, the excitation may be a step function between a first level and a second level. In other examples, a square wave calibration signal may be generated to determine the resonance frequency of the VCA 108 if the VCA is a LRA or a VCM.

In some examples if only one type of signal is required the command input 122 may be omitted. The current sensor 104 may detect a current flow in the voice coil of the VCA 108. A current signal corresponding to the current flow may be sent to the controller 112 via the current sensor output 116. The controller 112 may detect the degree of asymmetry from a measurement of the current signal due to the response of the VCA 108 to the generated signal s1. The term asymmetry used herein may be understood to mean that a portion of the current signal profile is not symmetrical. The degree of asymmetry may be understood as the extent to which the portion of the current signal profile lacks symmetry.

This degree of asymmetry in the current signal may be determined over a half cycle of the signal s1 by determining whether or not there is temporal symmetry over a quarter cycle. Temporal symmetry over a quarter cycle may be considered to mean that a sample or samples taken starting at a first distance from a transition have the same value when compared with a corresponding number of samples at the same distance from the next transition. The "line of symmetry" around which the samples are evaluated is the mid-point between two successive transitions. If the generated signal s1 has a period of T and if the first transition occurs at time t=0, then the second transition occurs at t=T/2, and the line of symmetry is positioned at the midpoint at t=T/4.

In some examples where the VCA 108 is a LRA, if the controller 112 determines that the signal s1 is asymmetrical, the controller 112 may control the signal generator 114 via the controller output 118 to generate an adapted drive signal by adjusting the frequency up or down in order to minimize or eliminate any asymmetry in the detected current signal resulting from the generated signal s1.

In some examples where the VCA 108 is either a VCM or LRA, the controller 112 may execute a calibration cycle whereby the drive signal has a varying frequency. The controller may determine a drive signal frequency which results in a current signal with minimal asymmetry or which is symmetrical. The controller 112 may then determine the resonance frequency from this drive signal frequency. The controller 112 may then control the signal generator 114 to generate an adapted drive signal dependent on the estimated resonance frequency. The adapted drive signal may then be used in normal operation.

In some examples if the VCA 108 is a VCM, the results of the calibration may be used to generate an adapted drive signal by adapting the filtering applied to the drive signal to reduce or eliminate signals frequencies at or near the resonant frequency. This may improve the control of a VCM by reducing unwanted oscillations. In other examples where the VCA 108 is a LRA, the results of the calibration may be used to generate an adapted drive signal by generating a drive signal at the estimated resonance frequency.

In other examples, where the VCA 108 is a LRA, as well as or instead of executing a calibration cycle, the controller 112 may control the signal generator 114 adapt the drive signal with a frequency adjusted to minimize or eliminate any asymmetry in the detected current signal provided from the current sensor 104, which may result in a higher acceleration of the LRA moving mass.

The VCA driver system 100 may be implemented in hardware or as a combination of hardware and software, for example software running on a digital signal processor, microcontroller or other microprocessor. The current sensor 104 may be implemented as hardware and typically may include an analog-to-digital converter. The VCA driver 102 may be an amplifier such as a class-D amplifier or other amplifier appropriate for driving the VCA 108.

Figure 2:
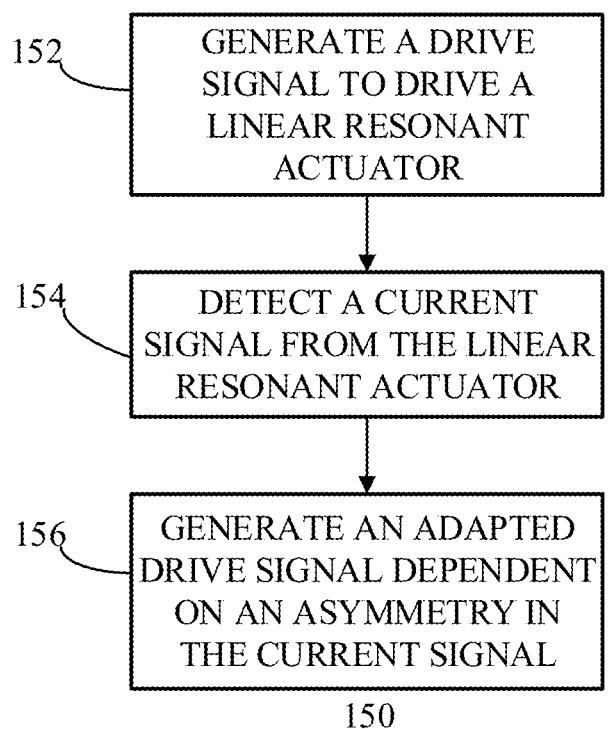
FIG. 2 illustrates a method of driving a voice coil actuator according to an example embodiment.

FIG. 2 shows a method for generating a voice coil actuator signal 150 which may for example be implemented by the VCA driver signal generator 110. In step 152 a signal may be generated to drive a VCA. In step 154 a current signal from the VCA resulting from the generated drive signal may be detected. In step 156 an adapted or adjusted drive signal may be generated in response to asymmetry in the current signal detected or determined in step 154. The adapted drive signal may be generated for example using one or more of the techniques used by the VCA driver signal generator 110.

The inventor of the present disclosure has appreciated that by determining whether the current signal resulting from a generated square wave is symmetrical or asymmetrical a measure of the resonance frequency of the VCA may be determined which may then be used to adapt a drive signal.

For example, a VCM may be driven by a certain voltage or current level to obtain the corresponding displacement level. However, simply applying a certain level will lead to a damped oscillation of the moving mass, due to which the stable displacement level is only reached after the ringing has become sufficiently small. To counter this, a VCM may be driven by changing the voltage or current level progressively over time so that the desired voltage or source level is obtained by using small increments or steps that cause negligible ringing. The time required to reach the desired voltage or current level is often related to the VCM resonance frequency. Alternatively, a VCM may be driven by a signal that is designed to cause minimal ringing, assuming a model of the VCM. Such a signal may be for example a step function filtered to attenuate the frequency region around the VCM resonance frequency which may be determined as described herein.

The VCA (LRA or VCM) resonance frequency is specified by the manufacturer, but factors such as sample spread, ageing and temperature can lead to a mismatch between the specified resonance frequency and the actual one, leading to sub-optimal excitation of the VCM. Furthermore, to cancel the residual ringing of the LRA after excitation or to quickly reach a stable displacement level of the VCM, a drive signal needs to be constructed which is often based on a parametric model of the VCA. The model parameters can also change due to the same factors.

For an LRA, by determining the resonance frequency, the frequency used for generating the driving signal may be adapted to more closely match the resonant frequency of the LRA. Existing methods for tracking the LRA resonance frequency rely on determining the back electromotive force signal (back-emf), which is generated by the velocity of the LRA moving mass. The back-emf is either estimated in short time segments in which the driving amplifier is set to a high-impedance state, or by measuring the current flowing into the LRA and estimating the back-emf using optimisation methods.

In contrast to previous adaptation techniques, the present disclosure does not require the calculation of a back-emf value for the LRA and furthermore the measurement may be done while the VCA driver 102 is active i.e. not tristate or disabled.

The use of evaluation of the signal asymmetry to determine the resonant frequency may be further understood from the following analysis.

The voltage equation for an LRA with a driving voltage v(t), is the following:

$$v(t) = R_e i(t) + L_e \frac{di(t)}{dt} + K\dot{x}(t) \quad (1)$$

where $R_e$ and $L_e$ are the DC resistance and inductance, ż is the velocity of the moving mass, and K is a constant. For the sake of simplicity, the inductance is assumed to have negligible influence on the properties under study, so it is set to zero. The current flowing into the LRA voice coil is simplified to:

$$i(t) = \frac{1}{R_e} v(t) - \frac{K}{R_e} \dot{x}(t) \quad (2)$$

The back-electromotive force (back-emf), caused by the moving mass velocity, ẋ, is observable as a component in the current. In the absence of a driving voltage, the current signal immediately yields a scaled and phase-inverted version of the back-emf, The scaling factor is temperature dependent, because $R_e$ varies with temperature. When a driving voltage signal v(t) is present, the DC resistance of the LRA, $R_e$, needs to be estimated to obtain the back-emf.

From equations (1) and (2) it may be seen that the current may give an indication of the resonant frequency of the LRA. A VCM response may be modelled using similar equations although the initial start-up behaviour may be different.

Figure 3:
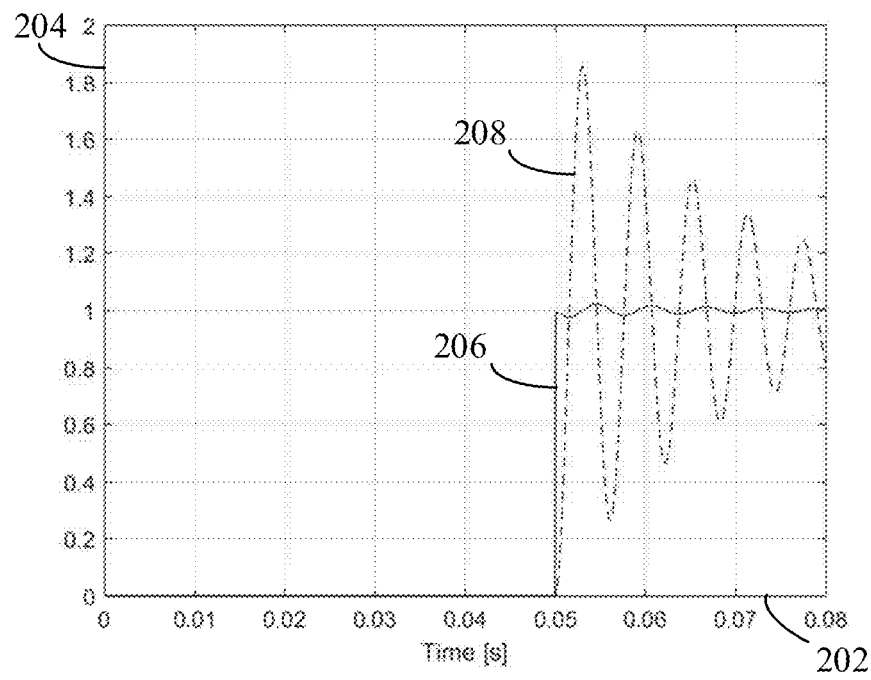
FIG. 3 illustrates plot of a step response of the current sense and displacement for a LRA.

FIG. 3 shows a simulated LRA response to a voltage step 200 starting at time t=50 milliseconds having an x-axis 202 showing time which ranges from 0 to 80 milliseconds and y-axis 204 showing a normalised signal value varying between 0 and 2. A VCM will display a similar type of response. Both the current signal shown by solid curve 206 and the displacement signal shown by dashed curve 208 are scaled to have a unit average value during the oscillation. The displacement response 208 consists of a damped oscillation at a frequency that corresponds to the LRA resonance frequency. Due to the back-emf, the current flowing into the LRA also shows this oscillation, but with a 90 degrees phase shift and with a much smaller amplitude. The first half-cycle of the current signal oscillation 206 is in the direction opposite the stationary level of the current signal and of the voltage. In the example LRA response 200, the current/voltage level is positive and the first half-cycle of the current signal oscillation starting at time t=50 milliseconds is in the negative direction.

In the example shown in FIG. 3, the oscillation amplitude of the current signal 206 is approximately 0.02 when compared to a unit DC current, which illustrates the practical difficulties in obtaining the back-emf signal. In the case of the step function input, the current signal 206 consists of a current step corresponding to the first term in equation (2) and the part related to the velocity displacement of the moving mass corresponding to the second term in equation (2). To estimate the back-emf signal, $R_e$ needs to be tracked and any estimation error will result in artefacts in the back-emf estimate. Since the oscillation in the current due to the back-emf is relatively small, extracting the second term in the equation to monitor the LRA behaviour is challenging.

If a signal needs to be generated with a fundamental frequency equal to the LRA resonance frequency, without prior knowledge of the resonance frequency, a signal type needs to be chosen that can change its fundamental frequency easily and quickly. One possibility is a rectangular or square wave, which consists of two levels between which the signal alternates or transitions. The time between the transitions, which corresponds to a half period of the square wave, can, in principle, be changed at any moment, without artefacts, effectively changing the fundamental frequency.

Figure 4:
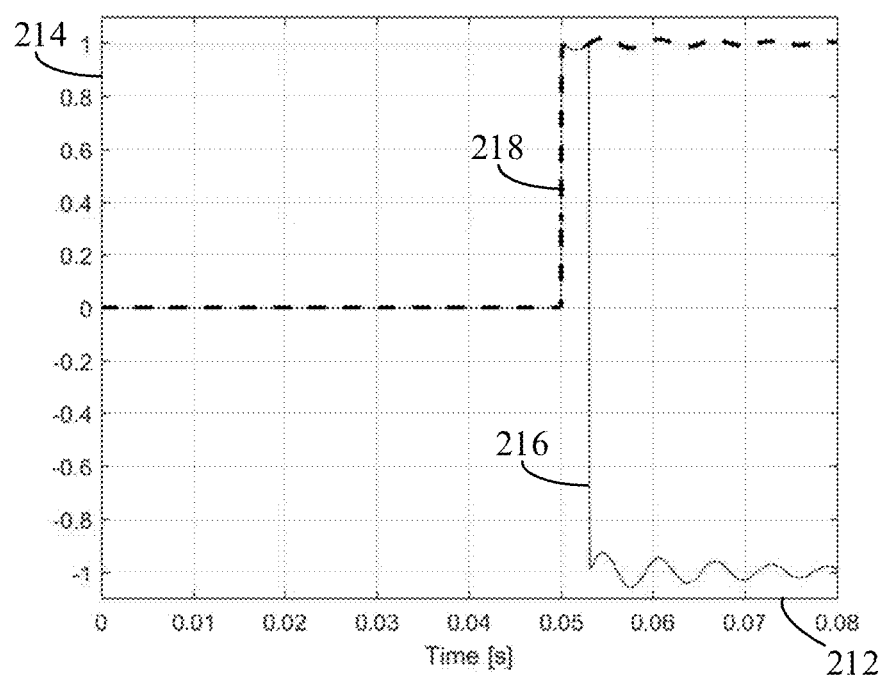
FIG. 4 illustrates a plot showing an example of sign-change at zero-crossings of the back-emf of a LRA.

From the LRA current step response 206, information is available to generate a rectangular wave at the LRA resonance frequency, namely by changing the sign of the signal at each zero-crossing of the back-emf. This may be understood with reference to FIG. 4 which shows a plot 210 of an example of sign change at zero-crossings of the back-emf. The x-axis 212 shows time varying between 0 and 80 milliseconds. The y-axis 214 shows the normalised current signal value varying between −1 and +1. The dashed curve 218 shows an initial current step response 216 with a transition occurring at 50 milliseconds corresponding to the current step response 206.

Taking the step response 218 as starting point and also with respect to the corresponding step response 206 and displacement 208 in FIG. 3, it can be observed that at the transient to the positive voltage level, the displacement 208 initially increases and reaches an extremum. At this point, the moving mass velocity which is the first derivative of the displacement is zero, due to which the back-emf is also zero, leading to a back-emf zero-crossing. The measured current does not cross the zero-line but crosses the $$\frac{V}{R_e}$$

line which is in this case unity. These points will be referred to hereon in as the back-emf zero-crossings, even though the back-emf is not explicitly estimated. After this point, the LRA mass starts moving in the opposite direction and displacement decreases, and therefore, the optimal driving voltage should also change sign. This triggers an opposite sign current step response 216 (solid curve) of the back-emf zero-crossing of which can, in turn, be used for determining the next transition point. Repeating this procedure yields a rectangular wave at the LRA resonance frequency, with transitions at the zero-crossings of the back-emf, without explicitly estimating the resonance frequency.

Figure 5:
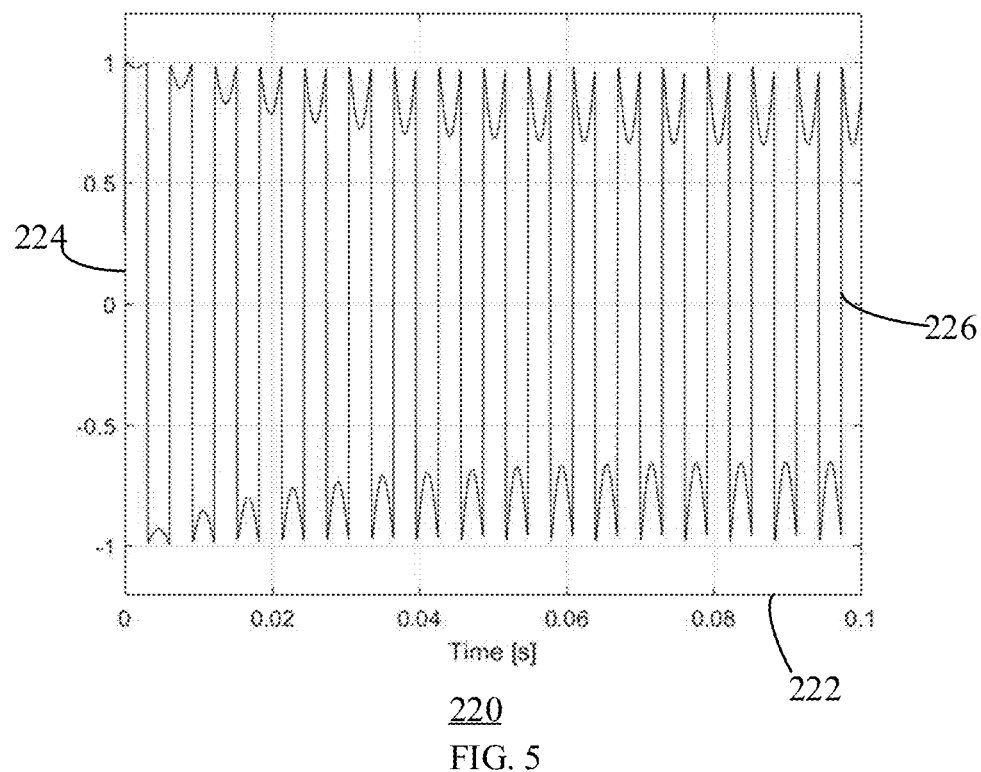
FIG. 5 shows a simulation of a current signal for a rectangular wave at the resonant frequency of a VCA.

FIG. 5 shows the current signal 220 for such a rectangular wave at the LRA resonance frequency. The current signal for a VCM response will look similar but may have a DC offset. The x-axis 222 shows time varying between 0 and 100 milliseconds. The y-axis 224 shows the normalised current signal value varying between −1 and +1. The velocity of the LRA moving mass is approximately a sine wave, due to which the back-emf is also close to a sine wave. The current signal 226 consists of the rectangular wave $$\left(\frac{1}{R_e}v(t)\right)$$

with me sine wave superimposed. As the oscillation builds up, the amplitude of this sine wave increases. The sine wave has the opposite sign of the rectangular wave.

Determining the zero-crossings of the back-emf corresponding to the points where the current signal crosses the stationary value is hampered by the inaccurate knowledge of the stationary value $$\left(\frac{1}{R_e}v(t)\right)$$

for the same reasons the back-emf is difficult to estimate from the current sense. The following observation allows for the introduction of useful criteria for determining the back-emf zero-crossings.

When the frequency of the rectangular wave is different from the LRA resonance frequency, the current signal shows more asymmetry within one half-period of the rectangular wave.

Figure 6:
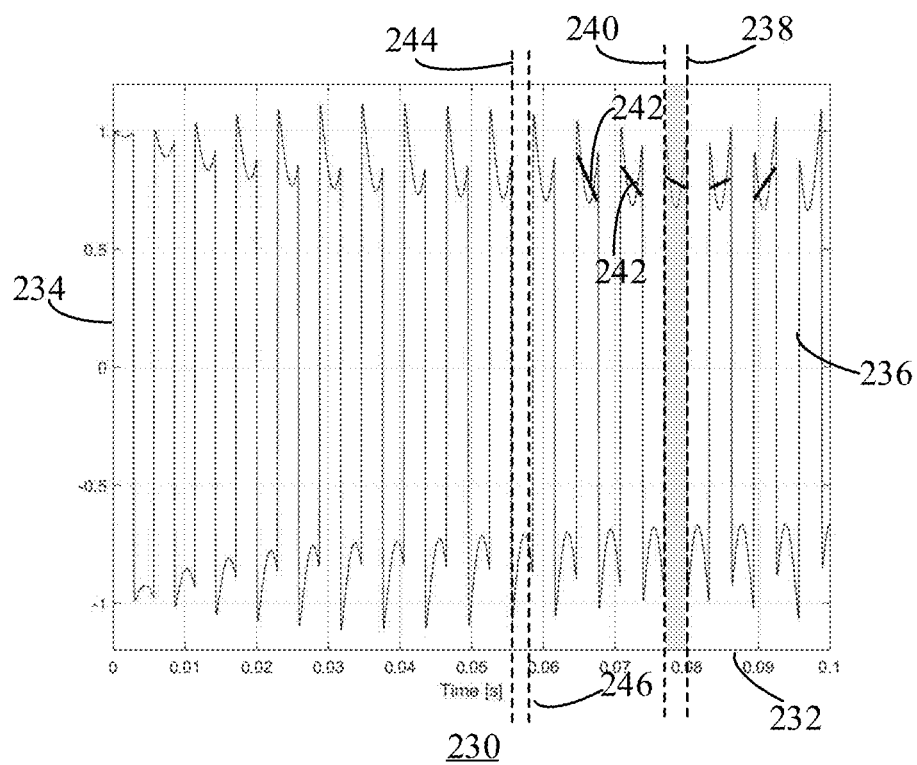
FIG. 6 shows a simulation of a current signal of a VCA for a rectangular wave with decreasing frequency.

FIG. 6 shows an example of a current signal for a LRA where the fundamental frequency is decreased over time 230. The current signal for a VCM response will look similar but may have a DC-offset. The x-axis 232 shows time varying between 0 and 100 milliseconds. The y-axis 234 shows the normalised current sense signal varying between −1 and +1. The region between dashed lines 238 and 240 corresponds to the segment where the frequency corresponds to the LRA resonance frequency. If the frequency is higher than the LRA resonance frequency which as illustrated is to the left of line 240, the beginning of the half-period segment is larger than the end. If the frequency is lower than the LRA resonance frequency which as illustrated is to the right side of line 238 the beginning of the half-period segment is smaller than the end. The reason is that the step response results in an oscillation at the LRA resonance frequency, which can be terminated earlier than the back-emf zero-crossing when the frequency is higher than the LRA resonance frequency or later than the back-emf zero-crossing when the frequency is lower than the LRA resonance frequency. In either case the current signal 236 does not reach the zero-crossing or goes further into the sine wave oscillation and is smaller/larger than at the previous back-emf zero-crossing. Hence, the temporal asymmetry of the measured current signal can be exploited for determining the 'optimal' time for the transition to the next level of the excitation signal.

A first asymmetry criterion $c_1$ (T) is the difference between the $n^{th}$ and the $(T-n-1)^{th}$ sample value, assuming a half-period T the time between two consecutive transitions of the excitation signal is given by:

$$c_1(T) = i[t_0 + i] - i\left[t_0 + \frac{T}{2} - i - 1\right] \quad (3)$$

where $t_0$ is the time of the transition and $$\frac{T}{2}$$

is the length of the drive signal half-period. Indeed, when the current signal follows the first half-period of a sine wave, it is symmetrical around a quarter-period i.e.

$$\frac{T}{4}.$$

If the excitation frequency is higher than the LRA resonance frequency, this criterion is positive, and if the excitation frequency is lower than the LRA resonance frequency, the criterion is negative. This criterion assumes the VCA excitation has a positive sign, and should be sign inverted if the excitation has a negative sign. It will therefore be appreciated that for example if evaluation segments using the negative transitions such as those as illustrated between dashed lines 244 and 246, then a negative difference indicates that a frequency should be decreased and a positive difference indicates that a frequency should be increased.

A second asymmetry criterion $c_2(T)$ is the average difference between the samples from the first half of the sample values and those from the second half and is given by:

$$c_2(T) = \sum_{i=1}^{\frac{T}{4}} \left( i[t_0 + i] - i\left[t_0 + \frac{T}{2} - i - 1\right] \right) \quad (4)$$

This criterion assumes the VCA excitation has a positive sign, and should be sign inverted if the excitation has a negative. Other variants of these criteria are possible, such as a weighted average difference. The criterion can be evaluated either on a sample-by-sample basis, in which case the criterion is computed for each sample with $$\frac{T}{2}$$

equal 10 me number 01 samples since the previous transition.

Another criterion is the slope of the regression line of the samples within one half-cycle. This is shown in FIG. 6, where this regression line 242 is shown as a thick line for a number of positive half-cycles. Within a half-cycle, all samples, or a subset of the samples are used to fit a linear regression line 242. If the signal is temporally symmetric within the half-cycle, the slope of the regression line will be zero (horizontal line). Therefore, the length of the half-cycle with the slope nearest to zero is indicative of the VCA resonance frequency.

In another implementation, a rectangular wave with known transitions, such as the current signal 236 shown in FIG. 6 can be output to the VCA, and the criterion can be computed for each segment between consecutive transitions with $$\frac{T}{2}$$

set to the known segment length. The length of the segment with the criterion value closest to zero corresponds to half a period of the VCA resonance frequency.

Figure 7:
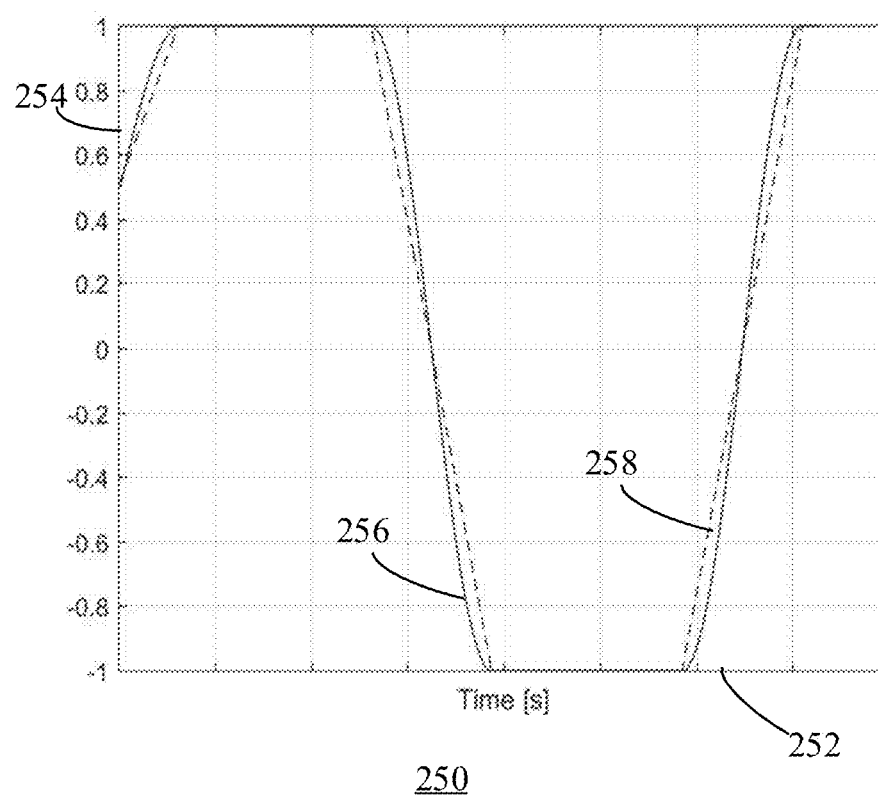
FIG. 7 illustrates a plot of example excitation signals for a LRA.

The generated drive signal may consist of alternating short-term stationary levels with optionally smoothed transitions to the next levels. For some actuators, such as a unidirectional VCM, a fixed DC level may be added. FIG. 7 shows an example generated signal 250. The x-axis shows time 252 and the y axis shows normalized values varying between −1 corresponding to a first stationary level and +1 corresponding to a second stationary level. The transition between two levels may be smoothed by linear interpolation between the consecutive levels within a certain time span indicated by dashed curve 258. The transition can also be implemented as a half period of a cosine function indicated by solid curve 256. Smoothing the transitions between levels ensures that the amplifier can adequately reproduce the signals and lowers possibly audible artefacts in the VCA.

Figure 8:
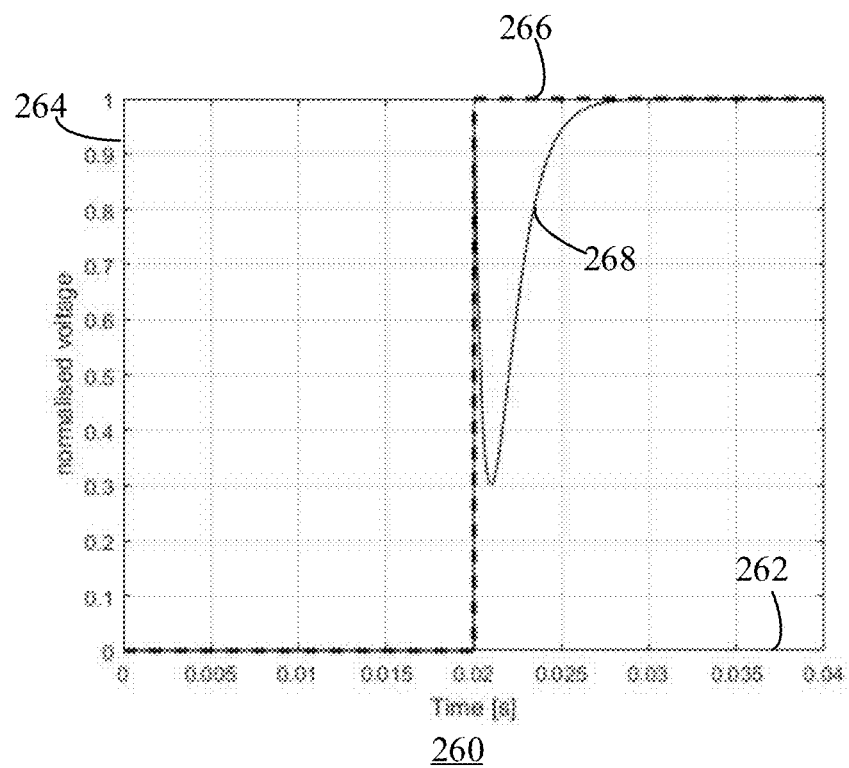
FIG. 8 shows a plot of example excitation signals for a VCM.

The generated drive signal may consist of a step function consisting of a single transition from a first level to a second level, as is the case for example when a VCM needs to displace a lens to a certain position to obtain the correct focus. The transition profile can be designed such that the ringing is reduced. FIG. 8 shows drive signals for a VCM 260. The x-axis 262 shows time in seconds from 0 to 0.04 seconds. The y-axis 264 shows the normalized voltage from 0 to 1. The transition profile can be obtained by filtering the step function 266 with a resonant filter with negative gain with a corner frequency at or near the VCM resonance frequency. This results in the transition profile shown in line 268. The corner frequency of the resonant filter may be chosen to be related to the optimal frequency obtained one of the implementations described earlier.

Figure 9:
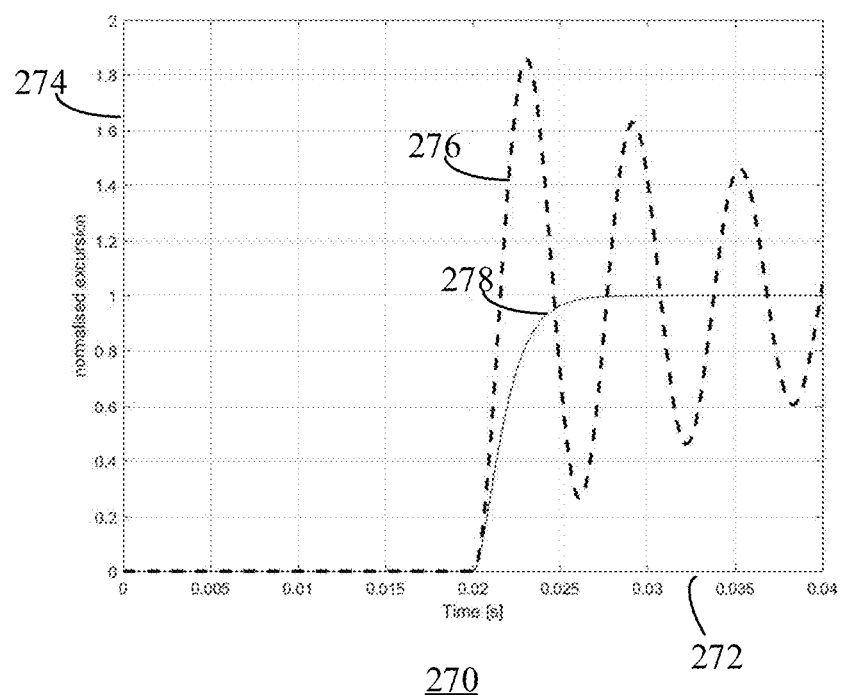
FIG. 9 illustrates a plot of the displacement response of the excitation signals of FIG. 8.

FIG. 9 shows the displacement resulting from these driving signals 270 The x-axis 272 shows time in seconds from 0 to 0.04 seconds. The y-axis 274 shows the normalized displacement from 0 to 2. Line 276 shows the displacement response for the step drive signal 266. Line 278 shows the displacement response for the filtered step drive signal 268. It can be observed that the effect of the resonant filter is the cancellation of the ringing, leading to a faster convergence of the VCM and lens position. There are other options that can be used as transition profiles, such as a linear ramp, possibly in fixed increments, from one level to the other in a time duration that is related to the VCM resonance frequency.

Figure 10:
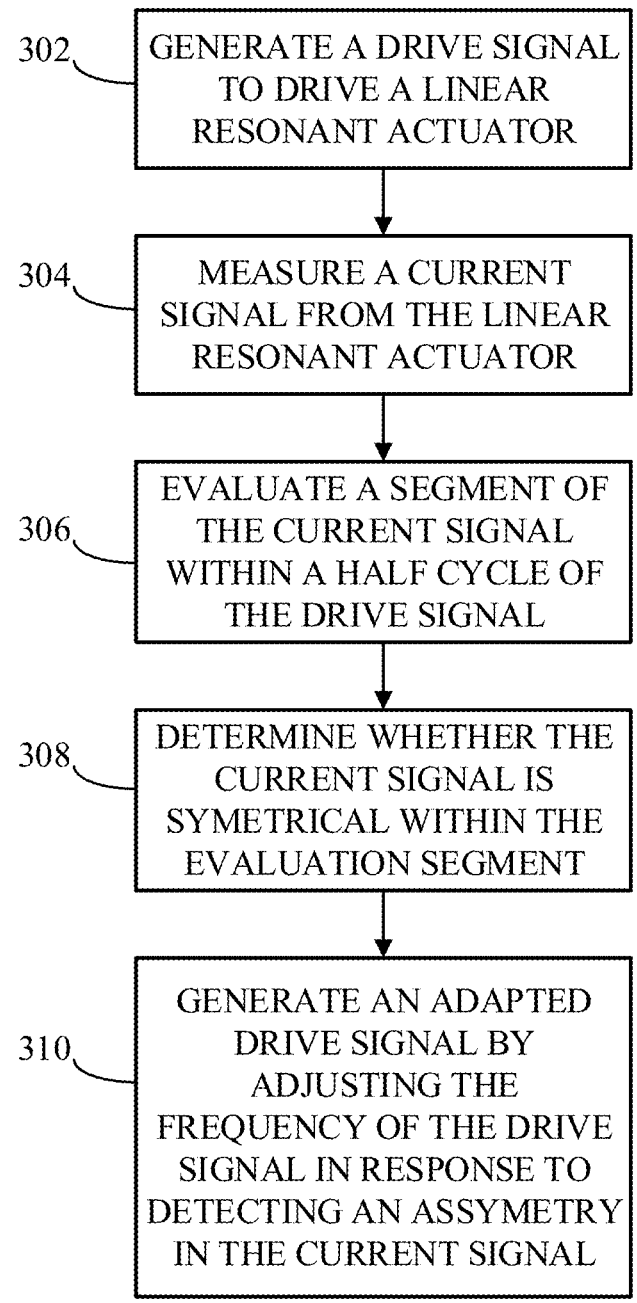
FIG. 10 shows a method of driving a linear resonant actuator according to an example embodiment.

FIG. 10 shows a method of generating a LRA drive signal 300. In step 302, a drive signal may be generated at an initial frequency. This signal may be a rectangular waveform or other wave form which has transitions between two stationary levels. In step 304, a current signal from a LRA may be measured. In step 306 a segment of the current signal within a half cycle of the drive signal may be evaluated. Because the drive signal is being generated, the transition time between the two levels will be known and consequently the evaluation segment can be selected which has a start (or first sample value) and finish (or final n-th sample value) approximately equidistant from respective successive transitions.

In general, if a first transition is at time t0, and the next transition is at time $$t_0 + \frac{T}{2},$$

the $n^{th}$ sample in the first quarter period where $$n < \frac{T}{4}$$

may be compared with a corresponding sample in the second quarter period at time $$t_0 + \frac{T}{2} - n - 1.$$

In this way me temporal symmetry within a half period or half cycle of the drive signal may be evaluated. The determination of the symmetry of the drive signal may be made in step 308. In step 310 an adapted drive signal may be generated by adjusting the frequency of the drive signal in response to detecting the asymmetry in the current signal.

Figure 11:
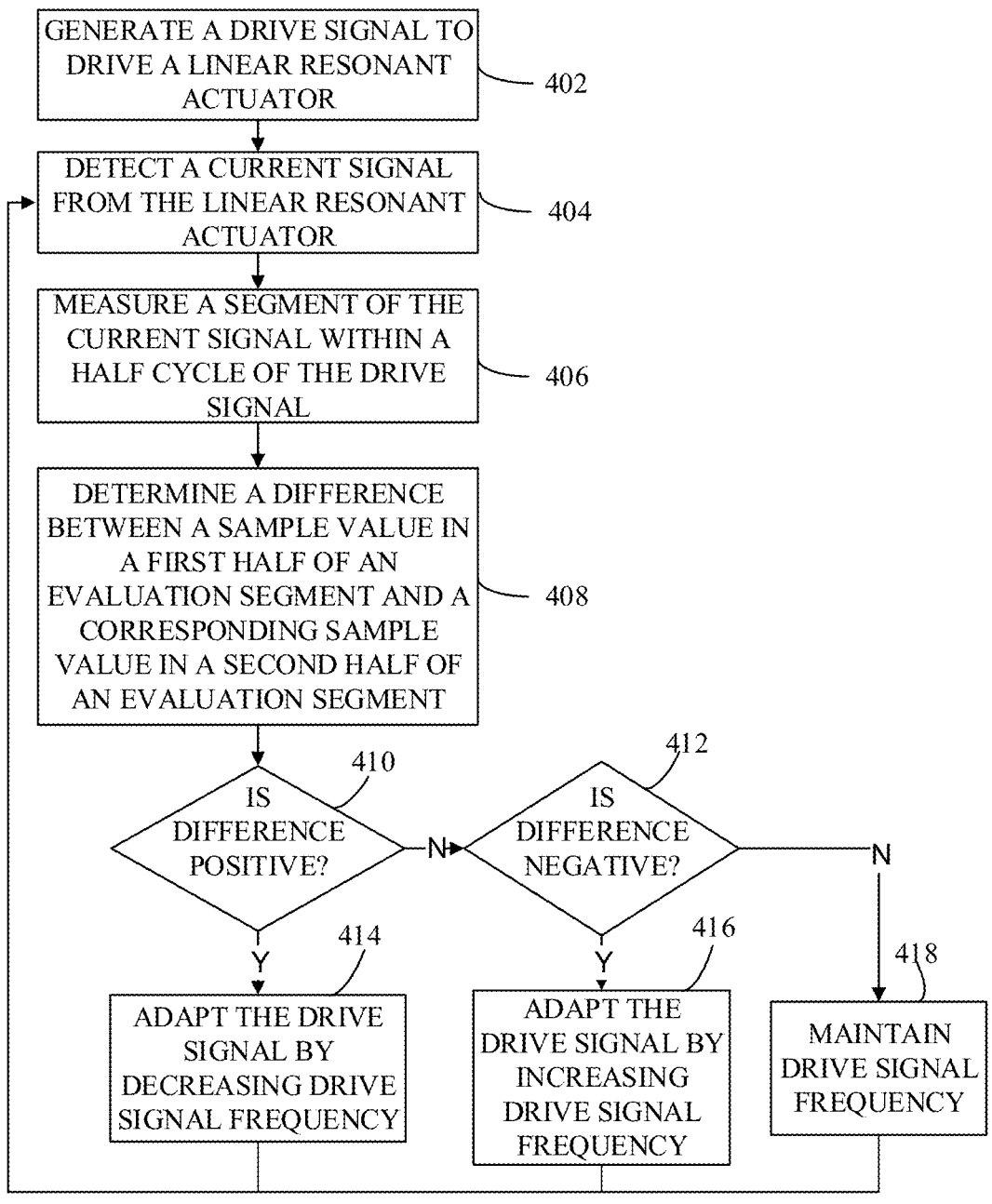
FIG. 11 illustrates a method of driving a linear resonant actuator according to an example embodiment.

FIG. 11 shows a method of generating a LRA drive signal 400. In step 402 drive signal may be generated at an initial frequency. This signal may be a rectangular waveform or other wave form which has transitions between two stationary levels. In step 404, a current signal from a LRA may be measured. In step 406 a segment of the current signal within a half cycle of the drive signal may be evaluated. The determination of the degree of asymmetry of the drive current signal may be made in step 408 by determining a difference between a sample value in a first half of an evaluation segment and a corresponding sample value in a second half of an evaluation segment. This may be done for example by implementing equation (3).

In step 410 a test may be made to determine whether the difference is positive. If the difference is positive the method proceeds to step 414 and an adapted drive signal may be generated by decreasing the drive signal frequency. The method may then return to step 404.

Returning to step 410, if the difference is not positive, the method proceeds to step 412 where a test may be made to determine whether the difference is negative. If the difference is negative, the method may proceed to step 416 and an adapted drive signal may be generated by increasing the drive signal frequency. The method may then return to step 404.

Returning to step 412, if the difference is not negative, this corresponds to a situation where the difference is zero i.e. the signal is symmetrical. In this case the method proceeds to step 418 and the drive signal frequency is maintained since this frequency may correspond to the optimal resonance frequency of the LRA being driven. The method may then return to step 404.

Figure 12:
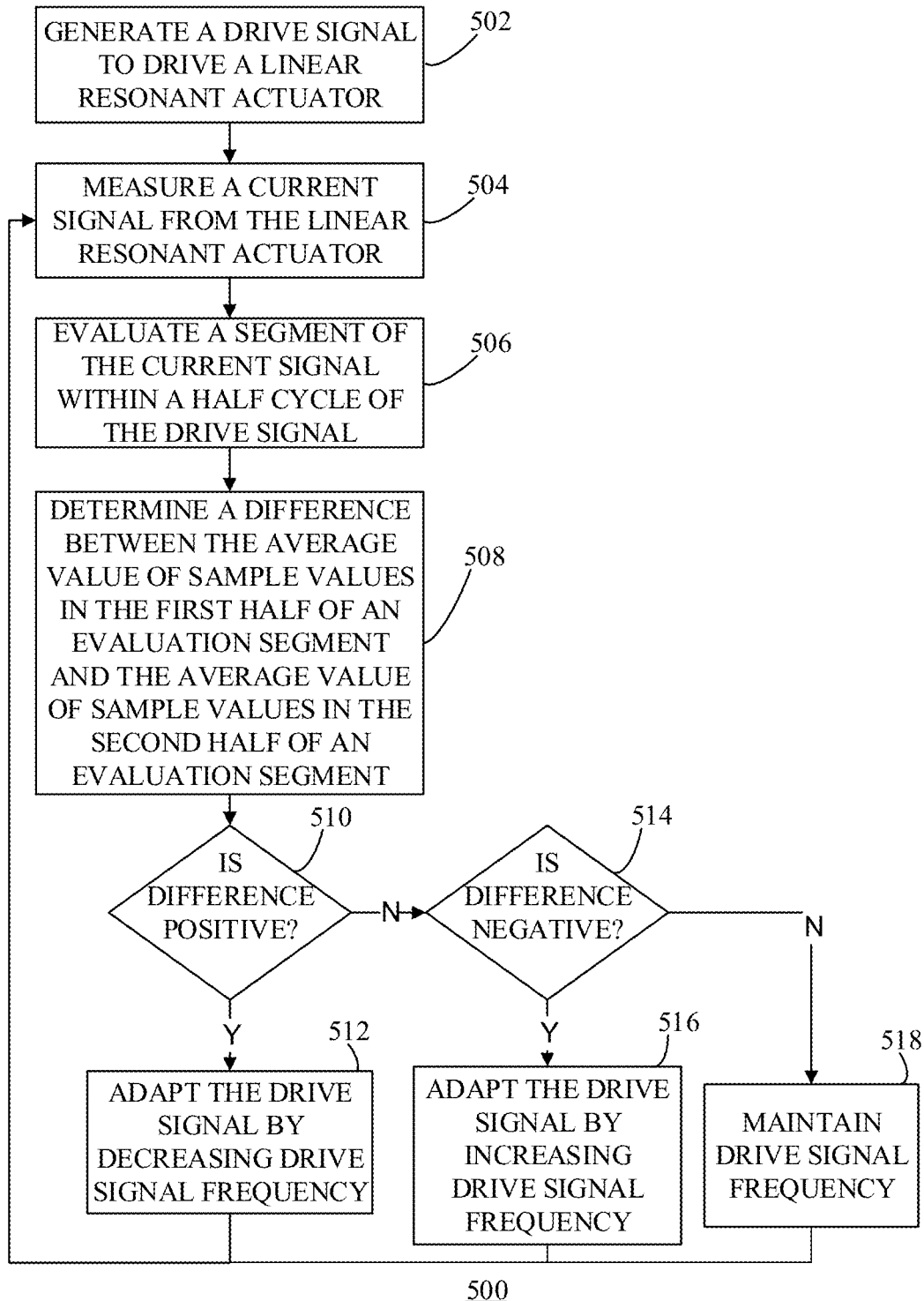
FIG. 12 illustrates a method of driving a linear resonant actuator according to an example embodiment.

FIG. 12 shows a method of generating a LRA drive signal 500. In step 502 drive signal may be generated at an initial frequency. This signal may be a rectangular waveform or other wave form which has transitions between two stationary levels. In step 504, a current signal from a LRA may be measured. In step 506 a segment of the current signal within a half cycle of the drive signal may be evaluated. The determination of the degree of asymmetry of the drive current signal may be made in step 508 by determining the average difference between the samples from the first half of the evaluation segment and those from the second half of the evaluation segment. This may be done for example by implementing equation (4).

In step 510 a test may be made to determine whether the difference is positive. If the difference is positive the method proceeds to step 514 and an adapted drive signal is generated by decreasing the drive signal frequency. The method may then return to step 504.

Returning to step 510, if the difference is not positive, the method proceeds to step 512 where a test may be made to determine whether the difference is negative. If the difference is negative, the method may proceed to step 516 and an adapted drive signal is generated by increasing the drive signal frequency. The method may then return to step 504.

Returning to step 512, if the difference is not negative, this corresponds to a situation where the difference is zero i.e. the signal is symmetrical. In this case the method proceeds to step 518 and the drive signal frequency is maintained since this frequency may correspond to the optimal resonant frequency of the LRA being driven. The method may then return to step 504.

The methods 300, 400 and 500 may be implemented for example by controller 112 and signal generator 114 in the LRA drive signal generator 110.

In some examples, the current signal can be analysed to determine the point at which the calibration signal frequency matches the VCA resonance frequency. For each half-period of the calibration stimulus, the asymmetry criterion may be computed, and the value indicating most symmetry relates to the estimated resonance frequency. This frequency may be stored and used for generating the signals requested by further commands. In this example embodiment, the current signal may have a latency exceeding the half-period of the VCA resonance frequency.

In other examples, a VCA driver signal generator, for example VCA driver signal generator 110 may be configured to generate a rectangular wave at a pre-stored frequency for driving a LRA, The pre-determined frequency may be determined using a calibration signal or one that is provided by the user. This pre-determined frequency may then be adapted. The current signal may be input to the signal generator 110 and used for computing the criterion for adaptation, which can be based on one the methods described earlier. If the asymmetry criterion indicates that the LRA resonance frequency is higher than the output signal frequency, the stimulus frequency can be increased, and if it indicates that the LRA resonance frequency is lower, the stimulus frequency can be decreased. In this example embodiment, the current signal may have a latency exceeding the half-period of the LRA resonance frequency.

In a further example, a VCA driver signal generator for example VCA driver signal generator 110 may be configured to construct an excitation signal for driving a LRA during playback. Given the proper command, for example via command input 112 to instruct the generation of an excitation signal, a signal generator may generate a first stationary level. The current signal is analysed and the signal generator transitions to a second stationary level in such a way that the transition coincides with the zero-crossing of the back-emf, which may be determined using the one of the methods described previously. For example if a transition to the second stationary level occurs when the $n^{th}$ value after the transient is reached again in the current sense, the transition to the next level should be performed after (n−1) samples. In this example embodiment, the current signal must have a latency lower than n samples to start the transition in time to coincide with the zero-crossing of the back-emf.

Figure 13:
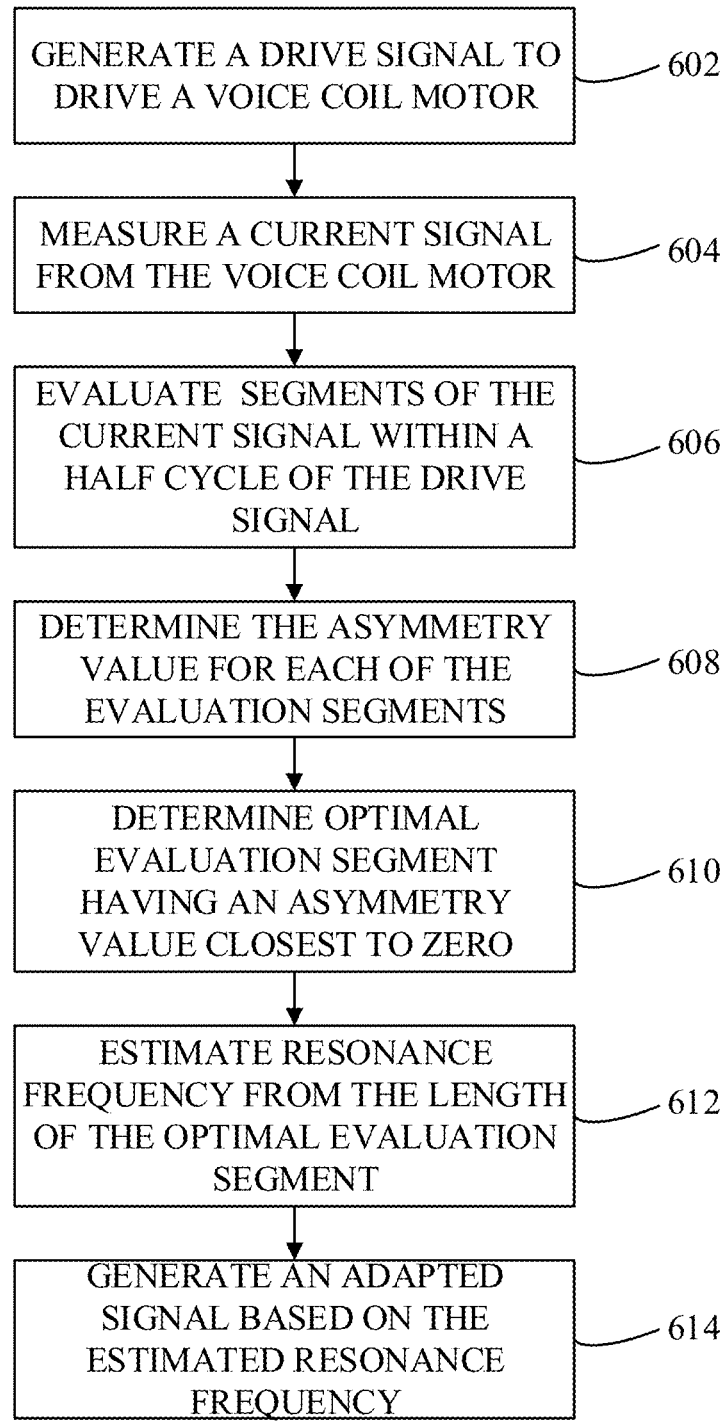
FIG. 13 illustrates a method of driving a VCA during calibration according to an example embodiment.

FIG. 13 shows a method of estimating the resonance frequency of a VCA 600. In step 602 a drive signal is generated for driving a voice coil motor. In a calibration phase, the drive signal will typically be a square wave or rectangular wave with a varying time period corresponding to a variation in the time between each transition. In step 604 a current is sensed or measured. Evaluation segments of the current signal consisting of segments of duration shorter than or equal to a half cycle of the drive signal i.e. between two successive transitions may be evaluated in step 606. Each segment will normally include a number of n samples. For each of the evaluation segments, an asymmetry value may be determined for each evaluation segment in step 608. The asymmetry value may be determined for example by comparing the difference between corresponding sample values equidistant from the mid-point of the evaluation segment. In other examples, the asymmetry value may be determined from the difference between the average of the sample values in the first half of the segment and the second half of the evaluation segment or other methods described herein. In step 610 an optimal evaluation segment may be identified. This optimal evaluation segment may be the evaluation segment having an asymmetry value close to zero, that is to say the most symmetric or least asymmetric of the evaluation segments. This length of this evaluation segment may be used to estimate the resonance frequency in step 612. In step 614 an adapted drive signal may be generated based on the resonance frequency.

For a VCM the adapted drive signal may be generated for example by filtering the drive signal based on the estimated resonance frequency. This may be done for example by setting the corner frequency of the filter characteristic to the estimated resonance frequency or a value within 5% of the estimated resonance frequency. This adapted drive signal may then be used in normal operation.

For a LRA the adapted drive signal may be generated for example by generating a drive signal at or close to the estimated resonance frequency of the LRA.

An apparatus and a method for generating a VCA signal is described. A drive signal is generated to drive the VCA and a resulting current signal from the VCA detected. The frequency of the drive signal is adapted in response to detecting an asymmetry in the current signal.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

What is claimed is:

1. A method for generating a voice coil actuator (VCA), drive signal comprising:
   generating a drive signal to drive a VCA, the generated drive signal being a periodic signal;
   receiving a current signal flowing into the VCA corresponding to the generated drive signal;
   generating an adapted drive signal dependent on an asymmetry of the current signal;
   wherein determining an asymmetry in the current signal comprises determining the asymmetry over an evaluation segment having a duration less than or equal to a half period of the drive signal and detecting an extent of the asymmetry in the current signal.

2. The method of claim 1 wherein generating the drive signal and generating the adapted drive signal comprises generating at least one transition between a first amplitude level and a second amplitude level.

3. The method of claim 2 wherein generating the adapted drive signal further comprises a filtering operation.

4. The method of claim 2 wherein generating the adapted drive signal further comprises adapting the time between consecutive transitions.

5. The method of claim 1 wherein determining an asymmetry in the current signal further comprises determining the difference between a sample value in the first half of the evaluation segment and a corresponding sample value in the second half of the evaluation segment.

6. The method of claim 5 wherein if the difference is positive, an adapted drive signal is generated by decreasing the drive signal frequency.

7. The method of claim 5 wherein if the difference is negative, an adapted drive signal is generated by increasing the drive signal frequency.

8. The method of claim 1 wherein determining an asymmetry in the current signal further comprises determining the average difference between sample values in the first half of the evaluation segment and corresponding sample values in the second half of the evaluation segment.

9. The method of claim 1 wherein determining an asymmetry in the current signal further comprises determining the slope of the linear regression curve of the samples in the evaluation segment.

10. The method of claim 1 wherein
the generated drive signal comprises a plurality of segments, each segment including a transition between a first amplitude level and a second amplitude level wherein the time between consecutive transitions is varied and;
measuring the current signal further comprises measuring a plurality of current signal segments, each current signal segment corresponding to a respective drive signal segment;
wherein the method further comprises estimating a resonance frequency of the VCA from the duration of the current signal segment with the least asymmetry, and generating the adapted drive signal dependent on the estimated resonance frequency of the VCA.

11. The method of claim 10 when dependent on claim 3 wherein generating the adapted drive signal comprises adapting the filter characteristics to have a stop-band including the estimated resonance frequency.

12. A computer program product comprising instructions which, when being executed by a processing unit, cause said processing unit to perform the steps of claim 1.

13. A voice coil actuator (VCA), driver signal generator comprising:
a signal generator configured to generate a drive signal to drive a VCA, the generated drive signal being a periodic signal;
a controller coupled to the signal generator and configured to be coupled to a current sensor for sensing a current signal flowing into the VCA, the current signal corresponding to the generated drive signal;
wherein the controller is configured to measure the current signal and to control the signal generator to generate an adapted drive signal dependent on an asymmetry in the current signal;
wherein the controller is further configured to detect an asymmetry in the current signal by determining the asymmetry over an evaluation segment having a duration less than or equal to a half period of the drive signal and detecting an extent of the asymmetry in the current signal.

14. The VCA driver signal generator of claim 13 wherein the controller is further configured to determine the asymmetry in the current signal by determining the slope of the linear regression curve of the samples in the evaluation segment.

15. The VCA driver signal generator of claim 13 wherein the controller is further configured to detect an asymmetry in the current signal by determining the average difference between sample values in the first half of the evaluation segment and sample values in the second half of the evaluation segment.

16. The VCA driver signal generator of claim 13 wherein generating the drive signal and generating the adapted drive signal comprises generating at least one transition between a first amplitude level and a second amplitude level.

17. The VCA driver signal generator of claim 15 wherein if the average difference is positive, an adapted drive signal is generated by decreasing the drive signal frequency.

18. The VCA driver signal generator of claim 15 wherein if the average difference is negative, an adapted drive signal is generated by increasing the drive signal frequency.

19. The method of claim 1 wherein the asymmetry means that a portion of the current signal profile is not symmetrical; the extent of the asymmetry is the extent to which the portion of the current signal profile lacks symmetry.

20. The VCA driver signal generator of claim 13 wherein the asymmetry means that a portion of the current signal profile is not symmetrical; the extent of the asymmetry is the extent to which the portion of the current signal profile lacks symmetry.

* * * * *